(12) United States Patent
Lee et al.

(10) Patent No.: US 12,132,203 B2
(45) Date of Patent: Oct. 29, 2024

(54) METHOD OF PREPARING POSITIVE ELECTRODE ACTIVE MATERIAL PRECURSOR FOR LITHIUM SECONDARY BATTERY AND POSITIVE ELECTRODE ACTIVE MATERIAL PRECURSOR PREPARED BY THE METHOD

(71) Applicant: LG Chem, Ltd., Seoul (KR)

(72) Inventors: Eung Ju Lee, Daejeon (KR); Ji Hun Jung, Daejeon (KR); Duck Gyun Mok, Daejeon (KR)

(73) Assignee: LG Chem, Ltd., Seoul (KR)

( * ) Notice: Subject to any disclaimer, the term of this patent is extended or adjusted under 35 U.S.C. 154(b) by 567 days.

(21) Appl. No.: 17/432,606

(22) PCT Filed: Feb. 28, 2020

(86) PCT No.: PCT/KR2020/002918
§ 371 (c)(1),
(2) Date: Aug. 20, 2021

(87) PCT Pub. No.: WO2020/180060
PCT Pub. Date: Sep. 10, 2020

(65) Prior Publication Data
US 2022/0123298 A1    Apr. 21, 2022

(30) Foreign Application Priority Data
Mar. 5, 2019 (KR) .......... 10-2019-0025285

(51) Int. Cl.
*H01M 4/525* (2010.01)
*C01G 53/00* (2006.01)
(Continued)

(52) U.S. Cl.
CPC .......... *H01M 4/525* (2013.01); *C01G 53/006* (2013.01); *H01M 4/505* (2013.01);
(Continued)

(58) Field of Classification Search
CPC .............................. H01M 4/525; H01M 4/505
See application file for complete search history.

(56) References Cited

U.S. PATENT DOCUMENTS

| 2010/0209771 A1 | 8/2010 | Shizuka et al. |
| 2013/0078520 A1 | 3/2013 | Toya et al. |
(Continued)

FOREIGN PATENT DOCUMENTS

| CN | 102884659 A | 1/2013 |
| CN | 103688396 A | 3/2014 |
(Continued)

OTHER PUBLICATIONS

International Search Report for Application No. PCT/KR2020/002918, mailing Jun. 10, 2020, 3 pages.
(Continued)

*Primary Examiner* — Olatunji A Godo
(74) *Attorney, Agent, or Firm* — Lerner David LLP

(57) ABSTRACT

A positive electrode active material precursor, a method of preparing the same, a positive electrode for a secondary battery and a lithium secondary battery which include the same are disclosed herein. In some embodiments, a method of preparing a positive electrode active material precursor includes adding a transition metal aqueous solution, an ammonium ion-containing solution, and a basic aqueous solution to an initial reaction solution, and performing a co-precipitation reaction to prepare a positive electrode active material precursor having an average particle diameter ($D_{50}$) of 3 μm to 5 μm, wherein the transition metal aqueous solution including a nickel raw material, a cobalt raw material, and a manganese raw material, and wherein the initial reaction solution includes a metal additive,
(Continued)

wherein the metal additive includes at least one element selected from the group consisting of Group 5 elements and Group 6 elements.

15 Claims, 3 Drawing Sheets

(51) Int. Cl.
*H01M 4/505* (2010.01)
*H01M 4/02* (2006.01)

(52) U.S. Cl.
CPC ...... *C01P 2004/03* (2013.01); *C01P 2004/54* (2013.01); *C01P 2004/61* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2013/0288129 A1 | 10/2013 | Toya et al. |
| 2014/0087263 A1 | 3/2014 | Matsumoto et al. |
| 2014/0106228 A1 | 4/2014 | Toya et al. |
| 2015/0228977 A1 | 8/2015 | Toya et al. |
| 2016/0087262 A1 | 3/2016 | Toya et al. |
| 2016/0244336 A1 | 8/2016 | Toya et al. |
| 2016/0248091 A1 | 8/2016 | Toya et al. |
| 2016/0322627 A1 | 11/2016 | Yoshida et al. |
| 2017/0050864 A1 | 2/2017 | Matsumoto et al. |
| 2017/0155146 A1 | 6/2017 | Lee et al. |
| 2017/0222221 A1* | 8/2017 | Park ..................... H01M 4/366 |
| 2017/0288223 A1* | 10/2017 | Ogawa ................. H01M 4/505 |
| 2017/0324081 A1 | 11/2017 | Toya et al. |
| 2017/0324092 A1 | 11/2017 | Yoshida et al. |
| 2018/0183039 A1 | 6/2018 | Koga et al. |
| 2018/0233740 A1 | 8/2018 | You et al. |
| 2018/0241040 A1 | 8/2018 | You et al. |
| 2018/0337403 A1* | 11/2018 | Komukai ............. H01M 4/366 |
| 2019/0140277 A1 | 5/2019 | Dong et al. |
| 2019/0214628 A1 | 7/2019 | Choi et al. |
| 2019/0263675 A1 | 8/2019 | Yoshida et al. |
| 2019/0288285 A1 | 9/2019 | Kim et al. |
| 2020/0052296 A1 | 2/2020 | Yoshida et al. |
| 2020/0119332 A1 | 4/2020 | Koga et al. |

FOREIGN PATENT DOCUMENTS

| | | |
|---|---|---|
| CN | 107394201 A | 11/2017 |
| CN | 109843810 A | 6/2019 |
| EP | 2557068 A1 | 2/2013 |
| JP | 2012256435 A | 12/2012 |
| JP | 2013235786 A | 11/2013 |
| JP | 2014183031 A | 9/2014 |
| JP | 6164332 B2 | 7/2017 |
| JP | 2017202971 A | 11/2017 |
| KR | 20100063041 A | 6/2010 |
| KR | 20130009739 A | 1/2013 |
| KR | 101694086 B1 | 1/2017 |
| KR | 20170045833 A | 4/2017 |
| KR | 20170046921 A | 5/2017 |
| KR | 20170063387 A | 6/2017 |
| KR | 20170084230 A | 7/2017 |
| KR | 101860596 B1 | 7/2018 |
| KR | 20180099542 A | 9/2018 |
| KR | 20190016963 A | 2/2019 |
| WO | 2018160023 A1 | 9/2018 |

OTHER PUBLICATIONS

T. Kimijima et al., "Molybdate flux growth of idiomorphic Li(Ni1/3Co1/3Mn1/3)O2 single crystals and characterization of their capabilities as cathode materials for lithium-ion batteries", Journal of Materials Chemistry A, published Mar. 2016, pp. 1-9, vol. 4, issue 9, Royal Society of Chemistry.

Search Report dated Oct. 26, 2022 from the Office Action for Chinese Application No. 202080017879.4 issued Nov. 7, 2022, pp. 1-3.

Extended European Search Report for Application No. 20766006.9 dated Mar. 15, 2022. 9 pgs.

* cited by examiner

[FIG. 1]
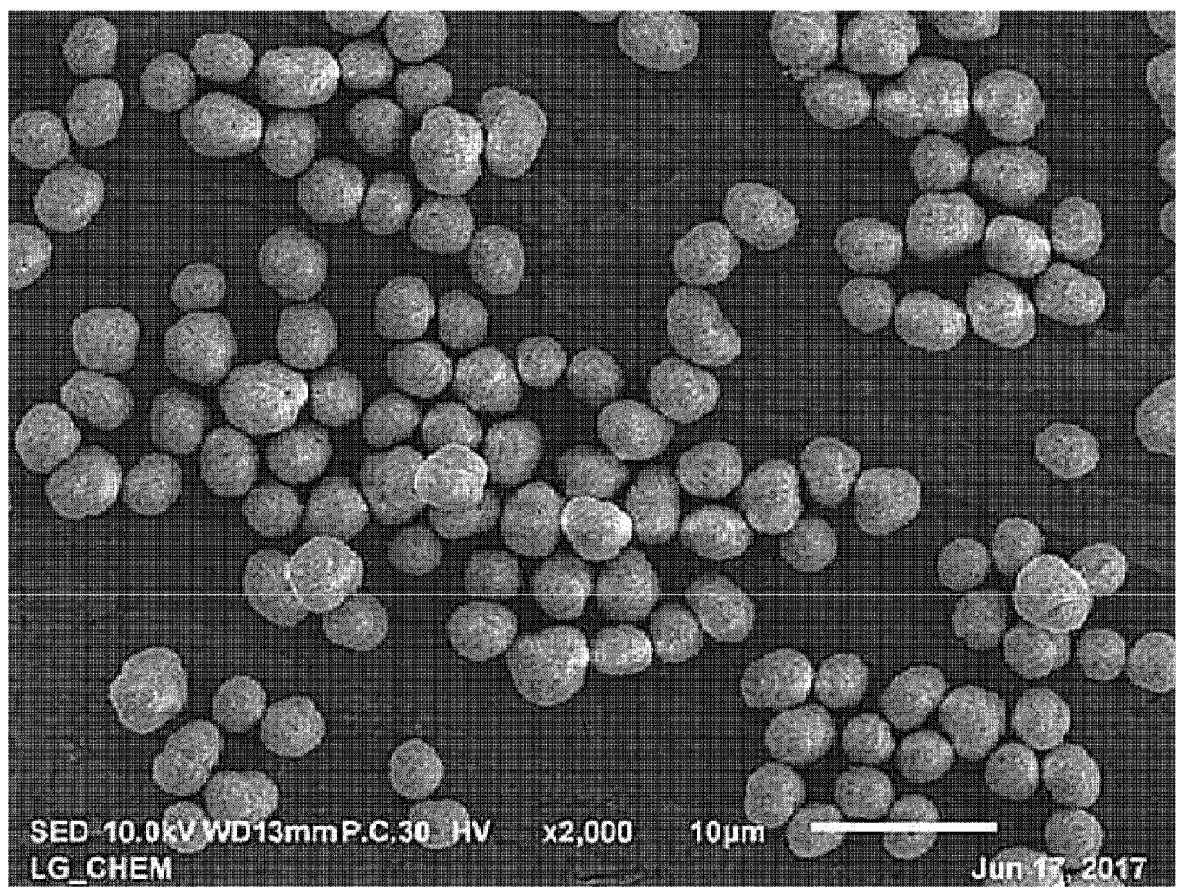

[FIG. 2]
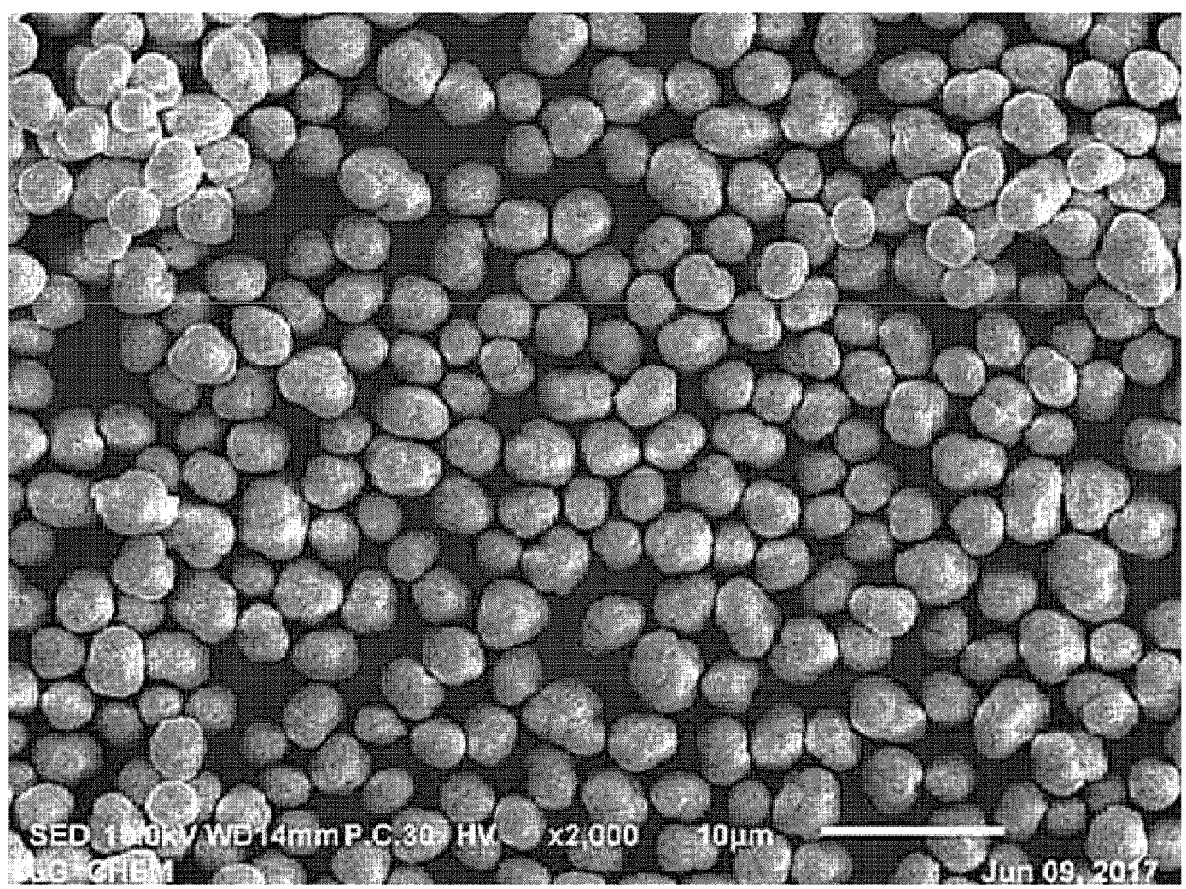

[FIG. 3]
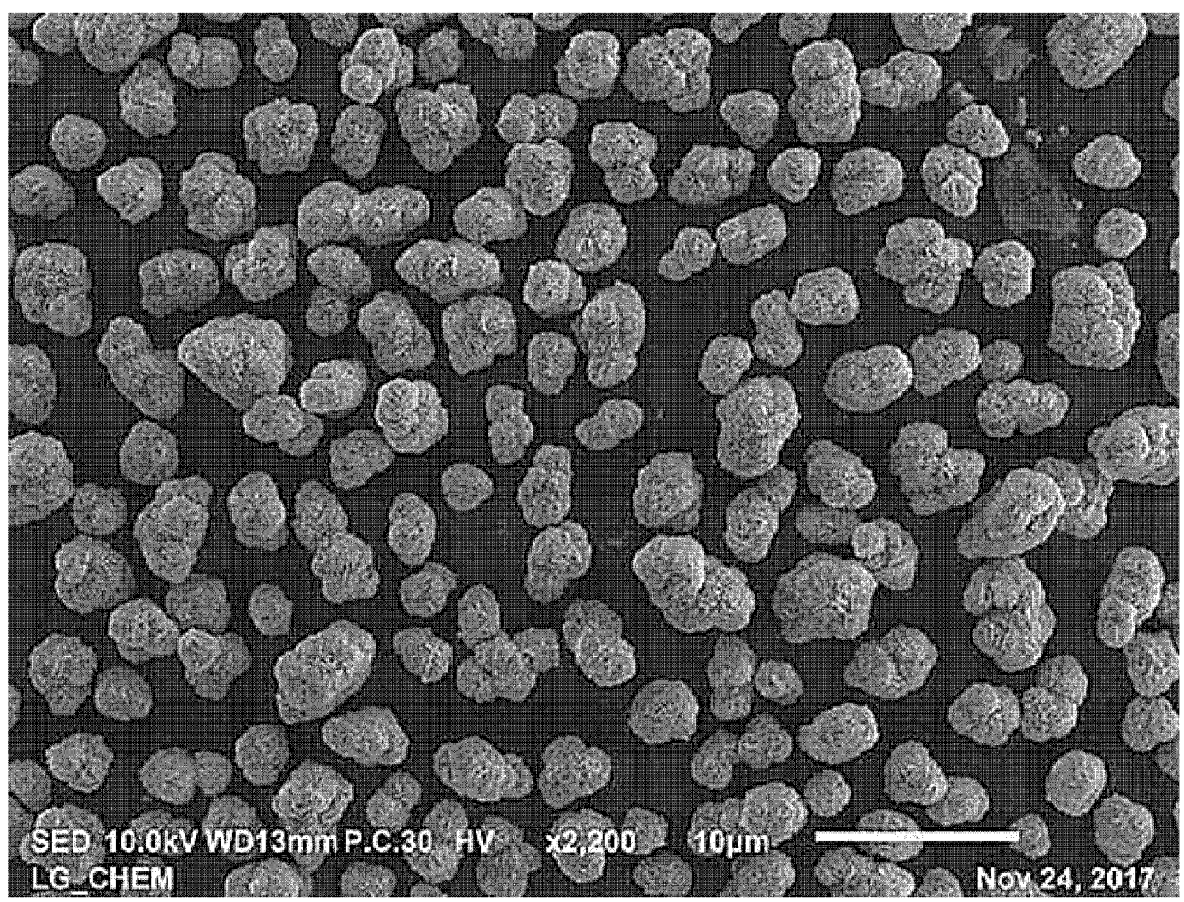

METHOD OF PREPARING POSITIVE ELECTRODE ACTIVE MATERIAL PRECURSOR FOR LITHIUM SECONDARY BATTERY AND POSITIVE ELECTRODE ACTIVE MATERIAL PRECURSOR PREPARED BY THE METHOD

CROSS-REFERENCE TO RELATED APPLICATIONS

This application is a national phase entry under 35 U.S.C. § 371 of International Application No. PCT/KR2020/002918, filed on Feb. 28, 2020, which claims priority from Korean Patent Application No. 10-2019-0025285, filed on Mar. 5, 2019, the disclosures of which are incorporated by reference herein.

TECHNICAL FIELD

The present invention relates to a method of preparing a positive electrode active material precursor for a lithium secondary battery, a positive electrode active material precursor prepared thereby, and a lithium secondary battery prepared by using the positive electrode active material precursor.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has very poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium nickel cobalt metal oxide, in which a portion of nickel (Ni) is substituted with cobalt (Co) and manganese (Mn) or aluminum (Al), has been developed.

However, with respect to the lithium nickel cobalt metal oxide, preparation of an electrode having high density is required to improve energy density per unit volume, and, in order to improve this, it is required that an average particle diameter ($D_{50}$) of the lithium nickel cobalt metal oxide is 6 μm or less, and a method of preparing a positive electrode active material precursor having excellent sphericity as well as a uniform particle size is required.

Typically, as a method of preparing the positive electrode active material precursor, there were a method of preparing a positive electrode active material precursor by using a continuous stirred tank reactor (CSTR) and a method of preparing a positive electrode active material precursor by using a batch-type reactor. The continuous stirred tank reactor (CSTR) discharges a precursor composed of particles simultaneously while raw materials are added and co-precipitated, and, with respect to the batch-type reactor, raw materials are added according to a volume of the reactor and reacted for a predetermined time, and a precursor is discharged after the completion of the reaction.

In general, the continuous stirred tank reactor (CSTR) method is advantageous in that the control of a metal composition ratio is easy, but, since the addition of the raw materials and the discharge of the product continuously occur at the same time, variations in residence time and reaction time of the positive electrode active material precursors formed in the reactor may be present, and, accordingly, there is a limitation in that non-uniformity in size and composition of the particles formed occurs.

Thus, there is a tendency to adopt the batch-type method which may easily control a particle size and may prepare a positive electrode active material precursor having a uniform particle size. However, in a case in which a positive electrode active material precursor having an average particle diameter ($D_{50}$) of 6 μm or less is prepared by using the batch-type reactor, it is necessary to control a concentration of an initial reaction solution initially added, an addition rate of the reaction solution, reaction temperature, reaction time, and stirring speed, and, particularly, since synthesis must be performed by increasing the stirring speed, there has been a limitation in preparing a large amount of the positive electrode active material precursor. Also, since the reaction time must also be maintained to some extent to uniformly form a surface of the positive electrode active material precursor, preparation time increases, and, accordingly, there has been a disadvantage that the positive electrode active material precursor continues to grow during the reaction time to make it difficult to prepare a positive electrode active material precursor having a small particle diameter.

Therefore, there is a need to develop a method of preparing a positive electrode active material precursor which may easily synthesize a large amount of the precursor having a small particle diameter while reducing preparation time.

DISCLOSURE OF THE INVENTION

Technical Problem

An aspect of the present invention provides a method of preparing a positive electrode active material precursor having an average particle diameter ($D_{50}$) of 3 μm to 5 μm by suppressing the growth of positive electrode active material precursor particles through the addition of a metal additive to an initial reaction solution during the preparation of the positive electrode active material precursor.

Another aspect of the present invention provides a positive electrode active material precursor having an average particle diameter ($D_{50}$) of 3 μm to 5 μm and a uniform particle size which is prepared by the above-described method.

Another aspect of the present invention provides a method of preparing a positive electrode active material by using the above-prepared positive electrode active material precursor and a positive electrode active material prepared thereby.

Another aspect of the present invention provides a positive electrode and a lithium secondary battery which include the above-prepared positive electrode active material.

Technical Solution

According to an aspect of the present invention, there is provided a method of preparing a positive electrode active material precursor which includes: a first step of adding a metal additive including at least one element selected from the group consisting of Group 5 elements and Group 6 elements to a reactor; and a second step of adding a transition metal aqueous solution including a nickel raw material, a cobalt raw material, and a manganese raw material, an ammonium ion-containing solution, and a basic aqueous solution to the reactor and performing a co-precipitation reaction to prepare a positive electrode active material precursor having an average particle diameter ($D_{50}$) of 3 μm to 5 μm.

According to another aspect of the present invention, there is provided a positive electrode active material precursor which includes nickel, cobalt, and manganese, and is doped with a metallic element including at least one element selected from the group consisting of Group 5 elements and Group 6 elements, wherein the positive electrode active material precursor has an average particle diameter ($D_{50}$) of 3 μm to 5 μm, has a ($D_{90}$–$D_{10}$)/$D_{50}$ of 0.5 to 1.5, and includes the metallic element in an amount of 100 ppm to 4,000 ppm based on a total weight.

According to another aspect of the present invention, there is provided a method of preparing a positive electrode active material which includes sintering after mixing the positive electrode active material precursor with a lithium raw material.

According to another aspect of the present invention, there is provided a positive electrode for a lithium secondary battery and a lithium secondary battery which include a positive electrode active material prepared by the method of preparing a positive electrode active material.

Advantageous Effects

According to the present invention, a small particle-diameter positive electrode active material precursor having an average particle diameter ($D_{50}$) of 3 μm to 5 μm may be prepared by suppressing growth of positive electrode active material precursor particles through the addition of a metal additive to an initial reaction solution during the preparation of the positive electrode active material precursor.

Also, since the growth of the positive electrode active material precursor particles is suppressed by the metal additive even if reaction time is increased for surface uniformity of the positive electrode active material precursor, a positive electrode active material precursor having excellent uniformity as well as a small particle diameter may be prepared.

BRIEF DESCRIPTION OF THE DRAWINGS

FIG. 1 is a scanning electron microscope (SEM) image of a positive electrode active material precursor prepared in Example 1 of the present invention;

FIG. 2 is an SEM image of a positive electrode active material precursor prepared in Example 2 of the present invention; and FIG. 3 is an SEM image of a positive electrode active material precursor prepared in Comparative Example 1 of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Throughout this specification, the expression "average particle diameter ($D_{50}$)" may be defined as a particle diameter at a cumulative volume of 50% in a particle size distribution curve. The average particle diameter ($D_{50}$), for example, may be measured by using a laser diffraction method. For example, in a method of measuring an average particle diameter ($D_{50}$) of a positive electrode active material, after particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at the cumulative volume of 50% may then be calculated by the measurement instrument.

Method of Preparing Positive Electrode Active Material Precursor

The present inventors have found that a small particle-diameter positive electrode active material precursor having an average particle diameter ($D_{50}$) of 3 μm to 5 μm may be prepared by suppressing growth of positive electrode active material precursor particles through the addition of a metal additive to an initial reaction solution during the preparation of the positive electrode active material precursor, and a large amount of the small particle-diameter positive electrode active material precursor may be prepared by using such a method, thereby leading to the completion of the present invention.

A method of preparing a positive electrode active material precursor according to the present invention includes: a first step of adding a metal additive including at least one element selected from the group consisting of Group 5 elements and Group 6 elements to a reactor; and a second step of adding a transition metal aqueous solution including a nickel raw material, a cobalt raw material, and a manganese raw material, an ammonium ion-containing solution, and a basic aqueous solution to the reactor and performing a co-precipitation reaction to prepare a positive electrode active material precursor having an average particle diameter ($D_{50}$) of 3 μm to 5 μm.

Hereinafter, each step will be described in more detail.

First, deionized water, an ammonium ion-containing solution, a basic aqueous solution, and a metal additive including at least one element selected from the group consisting of Group 5 elements and Group 6 elements are added to a reactor, and the reactor is purged with nitrogen gas.

Preferably, a batch-type reactor may be used as the reactor. Since the present invention uses the batch-type reactor as the reactor for preparing a positive electrode active material precursor, reaction conditions, such as concentration, temperature, and residence time, of reactants in the reactor are the same in comparison to a continuous stirred tank reactor (CSTR), and thus, a relatively uniform product without deviation may be prepared.

A pH in the reactor may be adjusted by adding an initial reaction solution including deionized water, an ammonium ion-containing solution, and a basic aqueous solution to the reactor to a predetermined volume of the reactor.

The basic aqueous solution may include at least one selected from the group consisting of NaOH, KOH, and $Ca(OH)_2$, and water or a mixture of water and an organic solvent (specifically, alcohol etc.), which may be uniformly mixed with the water, may be used as a solvent. In this case, the basic aqueous solution may have a concentration of 2 M to 15 M, preferably 5 M to 15 M, and more preferably 8 M to 13 M. In a case in which the basic aqueous solution has a concentration of 2 M to 15 M, uniform sized precursor particles may be formed, formation time of the precursor particles is fast, and a yield may also be excellent.

The ammonium ion-containing solution may include at least one selected from the group consisting of $NH_4OH$, $(NH_4)_2SO_4$, $NH_4NO_3$, $NH_4Cl$, $CH_3COONH_4$, and $(NH_4)_2CO_3$. Water or a mixture of water and an organic solvent (specifically, alcohol etc.), which may be uniformly mixed with the water, may be used as a solvent.

For example, the pH in the reactor may be adjusted to 11 to 13, preferably 12 to 13, and most preferably 12.3 to 12.8 by adding the initial reaction solution including the deionized water, the ammonium ion-containing solution, and the basic aqueous solution to the reactor to a predetermined volume of the reactor.

According to the present invention, when adding the initial reaction solution including the ammonium ion-containing solution and the basic aqueous solution, a metal additive including at least one element selected from the group consisting of Group 5 elements and Group 6 elements may be added together. According to the addition of the metal additive, since a precipitation reaction of transition metal hydroxide is accelerated by the metal additive during the subsequent synthesis of the positive electrode active material precursor particles and nucleation of the particles is given priority during the precipitation reaction, a co-precipitation reaction of the precursor may be performed while a state, in which small-sized particles are uniformly distributed, is maintained at an initial stage of the reaction. For example, with respect to a time of adding the metal additive, the metal additive may be added to the initial reaction solution as in the present invention or may be added during the co-precipitation reaction of the positive electrode active material precursor. However, in a case in which the metal additive is added during the co-precipitation reaction, since separate pipes for adding the metal additive must be additionally installed in the reactor, there is a limitation in that processing costs increase. In addition, in the case that the metal additive is added during the co-precipitation reaction, it may affect grain growth of a positive electrode active material, but, since it does not affect initial particle size control of the positive electrode active material precursor and unintentional fine powder generation and metallic element doping may occur, it is not easy to prepare the positive electrode active material precursor having an average particle diameter ($D_{50}$) of 3 μm to 5 μm according to the present invention. Thus, the addition of the metal additive together with the initial reaction solution is advantageous in terms of processing cost reduction and the particle size control of the positive electrode active material precursor.

The metal additive may include at least one element selected from the group consisting of Group 5 elements and Group 6 elements, and, for example, may include at least one element selected from the group consisting of tungsten (W), molybdenum (Mo), niobium (Nb), vanadium (V), tantalum (Ta), dubnium (db), chromium (Cr), and seaborgium (Sg). Since the metal additive includes at least one element selected from the group consisting of Group 5 elements and Group 6 elements, the nucleation of the particles becomes dominant than crystal growth when the initial transition metal hydroxide is precipitated, and thus, the co-precipitation reaction of the precursor may be performed while the state, in which small-sized particles are uniformly distributed, is maintained at the initial stage of the reaction. In addition, in terms of making a particle size of the positive electrode active material precursor uniform and controlling the particle size more easily, the metal additive may be selected from at least one selected from the group consisting of W, Mo, and Nb, and may most preferably include at least one metallic element from W or Mo.

The metal additive may be added in the form of a raw material including at least one element selected from the group consisting of Group 5 elements and Group 6 elements to the reactor, or may be added to the reactor after the metal additive is dissolved in the basic aqueous solution. For example, the metal additive may be easily dissolved in water or the basic aqueous solution, and the metal additive may be mixed in an amount such that a concentration of the metal additive in the initial reaction solution is in a range of 0.0005 M to 0.01 M, for example, 0.001 M to 0.008 M. Also, in a case in which the metal additive is added to the reactor after the metal additive is dissolved in the basic aqueous solution, the metal additive may be added by being dissolved in the basic aqueous solution such that a concentration of the metal additive is in a range of 0.0005 M to 0.01 M, for example, 0.001 M to 0.008 M.

The metal additive may be added in an amount such that the concentration of the metal additive in the initial reaction solution is in a range of 0.0005 M to 0.01 M, for example, 0.001 M to 0.008 M. In a case in which the concentration of the metal additive added to the initial reaction solution is less than the above range, since an effect of suppressing particle growth due to the addition of the metal additive is insignificant, the positive electrode active material precursor may be grown to a particle size of 6 μm or more. For example, in a case in which the concentration of the metal additive added to the initial reaction solution is greater than the above range, since the metal additive is excessively included during the synthesis of the precursor, a precursor having an unintended composition may be synthesized, and this may be present as an impurity.

For example, the metal additive may include at least one selected from the group consisting of $Li_2MoO_4$, $Na_2MoO_4$, $Li_2WO_4$, and $Na_2WO_4$.

Subsequently, a transition metal aqueous solution including a nickel raw material, a cobalt raw material, and a manganese raw material, an ammonium ion-containing solution, and a basic aqueous solution are added to the reactor and a co-precipitation reaction is performed to prepare a positive electrode active material precursor having an average particle diameter ($D_{50}$) of 3 μm to 5 μm.

The transition metal aqueous solution may include acetic acid salts, nitrates, sulfates, halides, sulfides, hydroxides, oxides, or oxyhydroxides of the above transition metals, and these materials are not particularly limited as long as they may be dissolved in water.

For example, the cobalt (Co) may be included as Co(OH)$_2$, CoOOH, Co(OCOCH$_3$)$_2$·4H$_2$O, Co(NO$_3$)$_2$·6H$_2$O, or CoSO$_4$·7H$_2$O, and any one thereof or a mixture of two or more thereof may be used.

Also, the nickel (Ni) may be included as Ni(OH)$_2$, NiO, NiOOH, NiCO$_3$, 2Ni(OH)$_2$·4H$_2$O, NiC$_2$O$_2$·2H$_2$O, Ni(NO$_3$)$_2$·6H$_2$O, NiSO$_4$, NiSO$_4$·6H$_2$O, a fatty acid nickel salt, or a nickel halide, and any one thereof or a mixture of two or more thereof may be used.

Furthermore, the manganese (Mn) may be included as a manganese oxide such as Mn$_2$O$_3$, MnO$_2$, and Mn$_3$O$_4$; a manganese salt such as MnCO$_3$, Mn(NO$_3$)$_2$, MnSO$_4$, manganese acetate, manganese dicarboxylate, manganese citrate, and a fatty acid manganese salt; an oxyhydroxide, and manganese chloride, and any one thereof or a mixture of two or more thereof may be used.

Also, in a case in which the finally prepared precursor further includes another metallic element (M) in addition to the nickel (Ni), manganese (Mn), and cobalt (Co) (for example, M is at least one element selected from the group consisting of aluminum (Al), zirconium (Zr), chromium (Cr), titanium (Ti), magnesium (Mg), tantalum (Ta), and niobium (Nb)), a metallic element (M)-containing raw material may be selectively further added during the preparation of the transition metal-containing solution.

The metallic element (M)-containing raw material may include an acetic acid salt, nitrate, sulfate, halide, sulfide, hydroxide, oxide, or oxyhydroxide containing the metallic element (M), and one thereof or a mixture of two or more thereof may be used. For example, in a case in which M is W, tungsten oxide may be used.

Preferably, the preparing of the positive electrode active material precursor includes a step of growing particles by adjusting amounts of the ammonium ion-containing solution and basic aqueous solution added and performing a co-precipitation reaction at a pH of 10 to 12 for 1 hour to 100 hours, preferably 10 hours to 80 hours, and more preferably 20 hours to 40 hours, after forming particle nuclei by adjusting amounts of the ammonium ion-containing solution and basic aqueous solution added and performing a co-precipitation reaction at a pH of 11 to 13 for 1 minute to 60 minutes, for example, 10 minutes to 50 minutes.

In other words, in the beginning of the reaction, the ammonium ion-containing solution and the basic aqueous solution are first added to adjust the pH to be in a range of 11 to 13, for example, 11.7 to 12.7, and, thereafter, particle nuclei may be formed while adding the transition metal-containing solution into the reactor. In this case, since the pH value changes as the particle nuclei are formed by the addition of the transition metal-containing solution, the pH value may be controlled to be maintained at 11 to 13 by continuously adding the ammonium ion-containing solution and the basic aqueous solution together with the transition metal-containing solution. If the pH value satisfies the above range, the particle nuclei may be preferentially formed, and the growth of the particles may hardly occur.

After the particle nucleation is completed, the pH is adjusted to be in a range of 10 to 12, for example, 10.5 to 11.7, by adjusting the amounts of the ammonium ion-containing solution and basic aqueous solution added, and the formed particle nuclei may be grown while adding the transition metal-containing solution. In this case, since the pH value also changes as the particles are grown by the addition of the transition metal-containing solution, the pH value may be controlled to be maintained at 10 to 12 by continuously adding the ammonium ion-containing solution and the basic aqueous solution together with the transition metal-containing solution. If the pH value satisfies the above range, a new particle nucleus may be hardly formed, and the growth of the particles may preferentially occur.

In a case in which the positive electrode active material precursor is prepared as described above, since the growth of the positive electrode active material precursor particles is suppressed by the metal additive, a positive electrode active material precursor having an average particle diameter ($D_{50}$) of 3 μm to 5 μm may be easily prepared.

Positive Electrode Active Material Precursor

Also, the present invention provides a positive electrode active material precursor which is prepared by the above-described method of preparing a positive electrode active material precursor, includes nickel, cobalt, and manganese, and is doped with a metallic element including at least one element selected from the group consisting of Group elements and Group 6 elements, wherein the positive electrode active material precursor has an average particle diameter ($D_{50}$) of 3 μm to 5 μm, has a ($D_{90}$–$D_{10}$)/$D_{50}$ of 0.5 to 1.5, and includes the metallic element in an amount of 100 ppm to 4,000 ppm based on a total weight.

The positive electrode active material precursor according to the present invention has an average particle diameter ($D_{50}$) of 3 μm to 5 μm, wherein it is formed to have a small particle diameter, and a particle size distribution is not only uniform, but a surface of the positive electrode active material is also formed in a spherical shape.

The positive electrode active material precursor may include the metallic element in an amount of 100 ppm to 4,000 ppm, preferably 100 ppm to 2,000 ppm, and most preferably 200 ppm to 2,000 ppm based on the total weight. Since the growth of the positive electrode active material precursor particles is suppressed by the metallic element, a positive electrode active material precursor having an average particle diameter ($D_{50}$) of 3 μm to 5 μm and a nearly spherical shape may be obtained.

For example, a ($D_{90}$–$D_{10}$)/$D_{50}$ value of the positive electrode active material precursor according to the present invention may be in a range of 0.5 to 1.5, preferably 0.5 to 1.0, more preferably 0.5 to 0.8, and most preferably 0.5 to 0.559, and, in a case in which the ($D_{90}$–$D_{10}$)/$D_{50}$ value of the positive electrode active material precursor is outside the above range, particle size uniformity of the positive electrode active material precursor particles formed may be reduced. For example, in a case in which the ($D_{90}$–$D_{10}$)/$D_{50}$ value of the positive electrode active material precursor is greater than 1.5, a deviation in the particle size of the positive electrode active material precursor may be large.

The positive electrode active material precursor according to the present invention may preferably have an aspect ratio of 0.8 to 1.0, for example, 0.85 to 1.0. Preferably, as the aspect ratio of the positive electrode active material precursor is closer to 1, the positive electrode active material precursor may have a spherical shape. For example, in a case in which the aspect ratio of the positive electrode active material precursor is less than 0.8, sphericity of the precursor may be reduced.

The aspect ratio of the positive electrode active material precursor denotes a ratio of a diameter perpendicular to a major axis (length of a minor axis passing through the center of the particle and perpendicular to the major axis) to a length of the positive electrode active material precursor particle (length of the major axis passing through the center of the particle). In the present invention, scanning electron microscope (SEM) images at a magnification of 2,000 times were taken, 10 particles with the most similar particle diameter to the average particle diameter ($D_{50}$) were selected, and the aspect ratio of the positive electrode active material precursor was calculated by (minor axis)/(major axis).

Positive Electrode Active Material and Method of Preparing Positive Electrode Active Material Also, according to the present invention, a positive electrode active material, which is prepared by using the positive electrode active material precursor prepared by the above method, may be provided.

Specifically, in order to prepare the positive electrode active material, a bimodal-type positive electrode active material precursor, which includes first positive electrode active material precursor particles having an average particle diameter ($D_{50}$) of 8 μm to 15 μm and a core-shell structure and second positive electrode active material precursor particles having an average particle diameter ($D_{50}$) of 1 μm to less than 8 μm, and a lithium-containing raw material may be mixed and sintered to prepare a positive electrode active material.

The lithium-containing raw material is not particularly limited as long as it is a compound including a lithium source, but, preferably, at least one selected from the group consisting of lithium carbonate ($Li_2CO_3$), lithium hydroxide (LiOH), $LiNO_3$, $CH_3COOLi$, and $Li_2(COO)_2$ may be used.

The bimodal-type positive electrode active material precursor and the lithium-containing raw material may be mixed in amounts such that a molar ratio of Me:Li is in a range of 1:0.9 to 1:1.8. In a case in which the lithium-containing raw material is mixed in a ratio less than the above range, capacity of the prepared positive electrode active material may be reduced, and, in a case in which the lithium-containing raw material is mixed in a ratio greater than the above range, since particles are sintered during a sintering process, the preparation of the positive electrode active material may be difficult, the capacity may be reduced, and separation of the positive electrode active material particles may occur after the sintering.

Subsequently, a mixture, in which the bimodal-type positive electrode active material precursor and the lithium-containing raw material are mixed, is sintered.

With respect to the positive electrode active material precursor according to the present invention, even if the average particle diameter ($D_{50}$) of the first positive electrode active material precursor particles and the average particle diameter ($D_{50}$) of the second positive electrode active material precursor particles are different, since an average composition of the first positive electrode active material precursor particles and a composition of the second positive electrode active material precursor particles are different as described above, the different compositions of the small particle-diameter and large particle-diameter positive electrode active material precursors may compensate for the influence by the temperature, that is, over-sintering of a small particle-diameter positive electrode active material and non-uniform sintering, in which sintering of a large particle-diameter positive electrode active material is insufficient, which may occur when the small particle-diameter and large particle-diameter positive electrode active material precursors are mixed and sintered at the same temperature, and thus, a positive electrode active material having good sintering uniformity may be prepared.

The sintering may be performed in a temperature range of 700° C. to 950° C. For example, in a case in which the sintering temperature is less than 700° C., since the raw materials may remain in the particles due to an insufficient reaction, high-temperature stability of the battery may be reduced and structural stability may be reduced due to decreases in volume density and crystallinity. In a case in which the sintering temperature is greater than 950° C., non-uniform growth of the particles may occur, and, since a size of the particles is excessively increased to reduce an amount of the particles per unit area, volume capacity of the battery may be reduced. In consideration of the particle size control, capacity, and stability of the prepared positive electrode active material particles and a reduction in lithium-containing by-products, the sintering temperature may be more preferably in a range of 770° C. to 850° C.

The sintering may be performed for 6 hours to 13 hours. In a case in which the sintering time is less than 6 hours, since reaction time is too short, it may be difficult to obtain a high crystalline positive electrode active material, and, in a case in which the sintering time is greater than 13 hours, the size of the particles may be excessively increased and production efficiency may be reduced.

Positive Electrode

Also, the present invention provides a positive electrode for a lithium secondary battery which includes the positive electrode active material prepared by the above-described method.

Specifically, provided is the positive electrode for a lithium secondary battery which includes a positive electrode collector and a positive electrode active material layer formed on the positive electrode collector, wherein the positive electrode active material layer includes a positive electrode active material according to the present invention.

In this case, since the positive electrode material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may selectively include a binder, if necessary, as well as a conductive agent in addition to the above-described positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Lithium Secondary Battery

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and de-doped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 parts by weight to 99 parts by weight based on a total weight of the negative electrode active material layer.

The binder is a component that assists in the binding between the conductive agent, the active material, and the current collector, wherein the binder is typically added in an amount of 0.1 part by weight to 10 parts by weight based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 parts by weight or less, for example, 5 parts by weight or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; fluorocarbon; metal powder such as aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexamethyl phosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 part by weight to 5 parts by weight based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

$NiSO_4 \cdot 6H_2O$, $CoSO_4 \cdot 7H_2O$, and $MnSO_4 \cdot H_2O$ were mixed in deionized water in amounts such that a molar ratio of nickel:cobalt:manganese was 90:5:5 to prepare a transition metal-containing solution with a concentration of 2.3 M.

A container containing the transition metal-containing solution was connected to a 20 L reactor. In addition, a 7.96 M NaOH aqueous solution and a 15% $NH_4OH$ aqueous solution were prepared and connected to the reactor, respectively.

3.8 L of deionized water, 0.2 L of ammonia water, 0.063 L of NaOH, and 2.8 g of $Na_2WO_4$ were added to the reactor such that a molar concentration of tungsten included in an initial reaction solution was 0.008 M. Thereafter, the reactor was purged with nitrogen gas at a rate of 5 mL/min to remove dissolved oxygen in the water and create a non-oxidizing atmosphere in the reactor. Thereafter, stirring was performed at a speed of 500 rpm and a temperature of 50° C. to maintain a pH in the reactor at 12.5.

Thereafter, the transition metal-containing solution, the NaOH aqueous solution, and the $NH_4OH$ aqueous solution were respectively added at rates of 6.3 mL/min, 4.2 mL/min, and 0.46 mL/min to the reactor and subjected to a co-precipitation reaction for 30 minutes to form nuclei of nickel manganese cobalt hydroxide particles. Subsequently, the addition rates of the NaOH aqueous solution and $NH_4OH$ aqueous solution added to the reactor were respectively adjusted to 3.8 mL/min and 0.46 mL/min to grow the nickel manganese cobalt hydroxide particles at a pH of 11.4 for 1,680 minutes, and thus, a positive electrode active material precursor, which had an average particle diameter ($D_{50}$) of 4.0 μm, had an average composition of $Ni_{0.90}Co_{0.05}Mn_{0.05}(OH)_2$, and included 700 ppm of W, was prepared.

Example 2

A positive electrode active material precursor, which had an average particle diameter ($D_{50}$) of 4.0 μm, had an average composition of $Ni_{0.90}Co_{0.05}Mn_{0.05}(OH)_2$, and included 340 ppm of Mo, was prepared in the same manner as in Example 1 except that 2.1 g of $Na_2MoO_4$ was added as a metal additive such that a molar concentration of molybdenum included in the initial reaction solution was 0.008 M.

Example 3

A positive electrode active material precursor, which had an average particle diameter ($D_{50}$) of 4.0 μm, had an average composition of $Ni_{0.90}Co_{0.05}Mn_{0.05}(OH)_2$, and included 700 ppm of W, was prepared in the same manner as in Example 1 except that 3.8 L of deionized water, 0.2 L of ammonia water, and 0.063 L of a NaOH solution, in which W was dissolved, were used as an initial reaction solution.

In this case, with respect to the NaOH solution in which W was dissolved, 2.8 g of $Na_2WO_4$ was added to the NaOH solution such that a molar concentration of tungsten included in the NaOH solution was 0.008 M.

Example 4

A positive electrode active material precursor, which had an average particle diameter ($D_{50}$) of 4.0 μm, had an average composition of $Ni_{0.90}Co_{0.05}Mn_{0.05}(OH)_2$, and included 17.5 ppm of W, was prepared in the same manner as in Example 1 except that 0.07 g of $Na_2WO_4$ was added to the initial reaction solution such that a molar concentration of tungsten included in the initial reaction solution was 0.0002 M.

Example 5

A positive electrode active material precursor, which had an average particle diameter ($D_{50}$) of 4.0 μm, had an average composition of $Ni_{0.90}Co_{0.05}Mn_{0.05}(OH)_2$, and included 70,000 ppm of W, was prepared in the same manner as in Example 1 except that 280 g of $Na_2WO_4$ was added to the initial reaction solution such that a molar concentration of tungsten included in the initial reaction solution was 0.8 M.

Comparative Example 1

A positive electrode active material precursor was prepared in the same manner as in Example 1 except that a metal additive was not added to the reactor.

Comparative Example 2

$NiSO_4 \cdot 6H_2O$, $CoSO_4 \cdot 7H_2O$, and $MnSO_4 \cdot H_2O$ were mixed in deionized water in amounts such that a molar ratio of nickel:cobalt:manganese was 90:5:5 to prepare a transition metal-containing solution with a concentration of 2.3 M. $Na_2WO_4$ was mixed in deionized water to prepare a tungsten-containing aqueous solution with a concentration of 0.06 M.

A container containing the transition metal-containing solution and a container containing the tungsten-containing aqueous solution were connected to a 20 L reactor, respectively.

After 3.8 L of deionized water, 0.2 L of ammonia water, and 0.063 L of NaOH were added to the reactor, the reactor was purged with nitrogen gas at a rate of 5 mL/min to remove dissolved oxygen in the water and create a non-oxidizing atmosphere in the reactor. Thereafter, stirring was performed at a speed of 500 rpm and a temperature of 50° C. to maintain a pH in the reactor at 12.5.

Subsequently, the transition metal-containing solution, the tungsten-containing aqueous solution, a NaOH aqueous solution, and a $NH_4OH$ aqueous solution were respectively added at rates of 6.3 mL/min, 0.88 mL/min, 4.2 mL/min, and 0.46 mL/min to the reactor and subjected to a co-precipitation reaction for 30 minutes to form nuclei of nickel manganese cobalt tungsten hydroxide particles.

Subsequently, the addition rates of the NaOH aqueous solution and $NH_4OH$ aqueous solution added into the reactor were respectively adjusted to 3.8 mL/min and 0.46 mL/min to grow the nickel manganese cobalt tungsten hydroxide particles at a pH of 11.4 for 1,680 minutes, and thus, a positive electrode active material precursor, which had an average particle diameter ($D_{50}$) of 5.4 μm, had an average composition of $[Ni_{0.90}Co_{0.05}Mn_{0.05}]_{0.997}W_{0.003}(OH)_2$, and included 8,000 ppm of W, was prepared.

Experimental Example 1: Identification of Surface Characteristics of Positive Electrode Active Material Precursor The positive electrode active material precursors prepared in Examples 1 to 5 and Comparative Examples 1 and 2 were photographed with a scanning electron microscope to identify particle characteristics of the positive electrode active material precursors formed. Also, scanning electron microscope (SEM) images at a magnification of 2,000 times were taken, 10 particles with the most similar particle diameter to the average particle diameter ($D_{50}$) were selected, and each of aspect ratios of the positive electrode active material precursor particles prepared in Examples 1 to 5 and Comparative Examples 1 and 2 was calculated by (minor axis)/(major axis). The aspect ratios of the positive electrode active material precursors calculated above are presented in Table 1 below.

TABLE 1

|  | Aspect ratio |
|---|---|
| Example 1 | 0.89 |
| Example 2 | 0.91 |
| Example 3 | 0.88 |
| Example 4 | 0.73 |
| Example 5 | 0.89 |
| Comparative Example 1 | 0.72 |
| Comparative Example 2 | 0.69 |

Referring to FIGS. 1 through 3, with respect to the positive electrode active material precursors prepared in Examples 1 and 2, it may be confirmed that they had a nearly spherical and uniform shape. In contrast, with respect to the positive electrode active material precursor prepared in Comparative Example 1, it may be confirmed that its surface was not uniform and it was not formed in a spherical shape.

Also, referring to Table 1, the positive electrode active material precursors prepared in Examples 1 to 5 had aspect ratios close to 1 in comparison to the positive electrode active material precursors prepared in Comparative Examples 1 and 2, and, accordingly, it may be confirmed that sphericities of the positive electrode active material precursors prepared in Examples 1 to 5 were better than those of Comparative Examples 1 and 2.

Experimental Example 2: Particle Size Distribution Check

In order to check particle size distributions of the positive electrode active material precursor particles prepared in Examples 1 to 5 and Comparative Examples 1 and 2, particle diameters of the positive electrode active material precursors formed in Examples 1 to 5 and Comparative Examples 1 and 2 were measured using a particle size distribution measurement instrument (S-3500, Microtrac), and the results thereof are presented in Table 2 below.

TABLE 2

|  | $D_{10}$ (μm) | $D_{50}$ (μm) | $D_{90}$ (μm) | $(D_{90}-D_{10})/D_{50}$ |
|---|---|---|---|---|
| Example 1 | 3.04 | 3.94 | 5.08 | 0.518 |
| Example 2 | 3.12 | 3.95 | 5.21 | 0.529 |
| Example 3 | 2.96 | 3.89 | 5.12 | 0.555 |
| Example 4 | 4.07 | 5.54 | 7.35 | 0.592 |
| Example 5 | 3.12 | 4.03 | 5.22 | 0.521 |
| Comparative Example 1 | 4.10 | 5.32 | 7.08 | 0.560 |
| Comparative Example 2 | 4.05 | 5.42 | 7.13 | 0.568 |

Referring to Table 2, it may be confirmed that average particle diameters ($D_{50}$) of the positive electrode active material precursors prepared in Examples 1 to 5 were smaller than an average particle diameter ($D_{50}$) of the positive electrode active material precursor prepared in Comparative Example 1 to which a metal additive was not added. In addition, it may be confirmed that the positive electrode active material precursors prepared in Examples 1 to 3 and 5 had more uniform particle size distributions than the positive electrode active material precursors prepared in Comparative Examples 1 and 2.

According to Experimental Examples 1 and 2, it may be confirmed that a positive electrode active material precursor having an average particle diameter of 3 μm to 5 μm and excellent sphericity may be synthesized when the metal additive was added to the initial reaction solution.

The invention claimed is:

1. A method of preparing a positive electrode active material precursor, the method comprising:
adding a transition metal aqueous solution, an ammonium ion-containing solution, and a basic aqueous solution to an initial reaction solution, and performing a co-precipitation reaction to prepare a positive electrode active material precursor having an average particle diameter ($D_{50}$) of 3 μm to 5 μm,
wherein the transition metal aqueous solution including a nickel raw material, a cobalt raw material, and a manganese raw material, and
wherein the initial reaction solution includes a metal additive, wherein the metal additive includes at least one element selected from the group consisting of Group 5 elements and Group 6 elements,
wherein the metal additive has a concentration of 0.0005 M to 0.01 M.

2. The method of claim 1, wherein the metal additive comprises at least one element selected from the group consisting of tungsten (W), molybdenum (Mo), niobium (Nb), vanadium (V), tantalum (Ta), dubnium (Db), chromium (Cr), and seaborgium (Sg).

3. The method of claim 1, wherein the metal additive comprises at least one element selected from the group consisting of W, Mo, and Nb.

4. The method of claim 1, wherein the metal additive comprises at least one selected from the group consisting of $Li_2WO_4$, $Na_2WO_4$, $Li_2MoO_4$, and $Na_2MoO_4$.

5. The method of claim 1, wherein the initial reaction solution is a basic aqueous solution.

6. The method of claim 5, wherein the metal additive has a concentration of 0.0005 M to 0.01 M in the initial reaction solution.

7. The method of claim 1, comprising:
adjusting amounts of the ammonium ion-containing solution and the basic aqueous solution added and performing the co-precipitation reaction at a pH of 11 to 13 for 1 minute to 60 minutes to form particle nuclei; and then adjusting amounts of the ammonium ion-containing solution and the basic aqueous solution added and performing the co-precipitation reaction at a pH of 10 to 12 for 1 hour to 100 hours to grow particles of the positive electrode active material precursor.

8. A positive electrode active material precursor, comprising:

nickel, cobalt, and manganese, and is doped with a metallic element including at least one element selected from the group consisting of Group 5 elements and Group 6 elements, wherein the metallic element is present in an amount of 100 ppm to 4,000 ppm based on a total weight of the positive electrode active material precursor, wherein the positive electrode active material precursor has an average particle diameter ($D_{50}$) of 3 μm to 5 μm, and has a $(D_{90}-D_{10})/D_{50}$ of 0.5 to 1.5.

9. The positive electrode active material precursor of claim 8, wherein the $(D_{90}-D_{10})/D_{50}$ is in a range of 0.5 to 0.559.

10. The positive electrode active material precursor of claim 8, wherein the metallic element comprises at least one element selected from the group consisting of tungsten (W), molybdenum (Mo), niobium (Nb), vanadium (V), tantalum (Ta), dubnium (Db), chromium (Cr), and seaborgium (Sg).

11. The positive electrode active material precursor of claim 8, wherein the metallic element comprises at least one element selected from the group consisting of W, Mo, and Nb.

12. The positive electrode active material precursor of claim 8, wherein the positive electrode active material precursor has an aspect ratio of 0.8 to 1.0.

13. A method of preparing a positive electrode active material, the method comprising sintering after mixing the positive electrode active material precursor prepared by the method of claim 1 with a lithium raw material.

14. A positive electrode for a lithium secondary battery, the positive electrode comprising a positive electrode active material prepared by the method of claim 13.

15. A lithium secondary battery comprising the positive electrode of claim 14.

* * * * *